United States Patent [19]

Treslo

[11] 4,064,714
[45] Dec. 27, 1977

[54] LOCK BAR ASSEMBLY

[76] Inventor: Angelo Treslo, 1740 N. Linder Ave., Chicago, Ill. 60639

[21] Appl. No.: 614,366

[22] Filed: Sept. 18, 1975

[51] Int. Cl.² .................. E05B 71/00; E05B 73/00
[52] U.S. Cl. .................................... 70/18; 70/62; 70/233
[58] Field of Search ............... 70/58, 61, 62, 57, 49, 70/30, 233, 234, 235, 14, 15, 18, 59, 60, 227

[56] References Cited

U.S. PATENT DOCUMENTS

| | | | |
|---|---|---|---|
| 1,320,588 | 11/1919 | Tiedemann | 70/227 |
| 1,401,721 | 12/1921 | Nicodemus | 70/15 |
| 1,416,393 | 5/1922 | Willett | 70/227 |
| 3,800,575 | 4/1974 | Perret | 70/233 |
| 3,908,414 | 9/1975 | Thorne | 70/18 |
| 3,910,602 | 10/1975 | Lindner | 70/233 |
| 3,922,894 | 12/1975 | Johnson | 70/18 |

FOREIGN PATENT DOCUMENTS

| | | | |
|---|---|---|---|
| 870,611 | 11/1940 | France | 70/234 |
| 404,570 | 10/1924 | Germany | 70/233 |

Primary Examiner—Paul R. Gilliam
Assistant Examiner—Kenneth J. Dorner
Attorney, Agent, or Firm—Dominik, Knechtel, Godula & Demeur

[57] ABSTRACT

There is disclosed a locking bar assembly adapted for attachment to a variety of articles in order to effect the interlocking of the articles, formed by a tube having opposed ends and being hollow throughout the interior portion thereof, the tube provided with a crimp portion adjacent each of the opposed ends, each of the crimp portions extending a substantial portion along the transverse diameter of the tube, a pair of first and second cables provided within the hollow tube and each cable having an interior end and an exterior end, each of the cables carrying stop means positioned at the interior ends thereof, the stop means coacting with the corresponding crimp to form a stop position such that the interior end of each cable in securely held within the tube, a lock head provided on the exterior end of the first cable and a mating lock pin provided on the exterior end of the second cable, each of the cables being reciprocally moveable into and out of the tube until the interior ends reach the stop positions such that once the tube is securely mounted to a given article, the two cables may be extracted from the confines of the tube and wound about the article until the interior ends reach the stop positions respectively, and the exterior ends matingly lock with the lock pin matingly engaged in the lock head.

7 Claims, 8 Drawing Figures

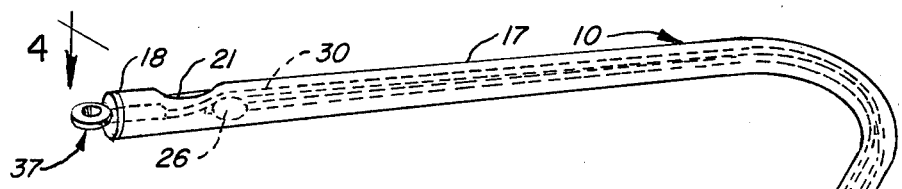
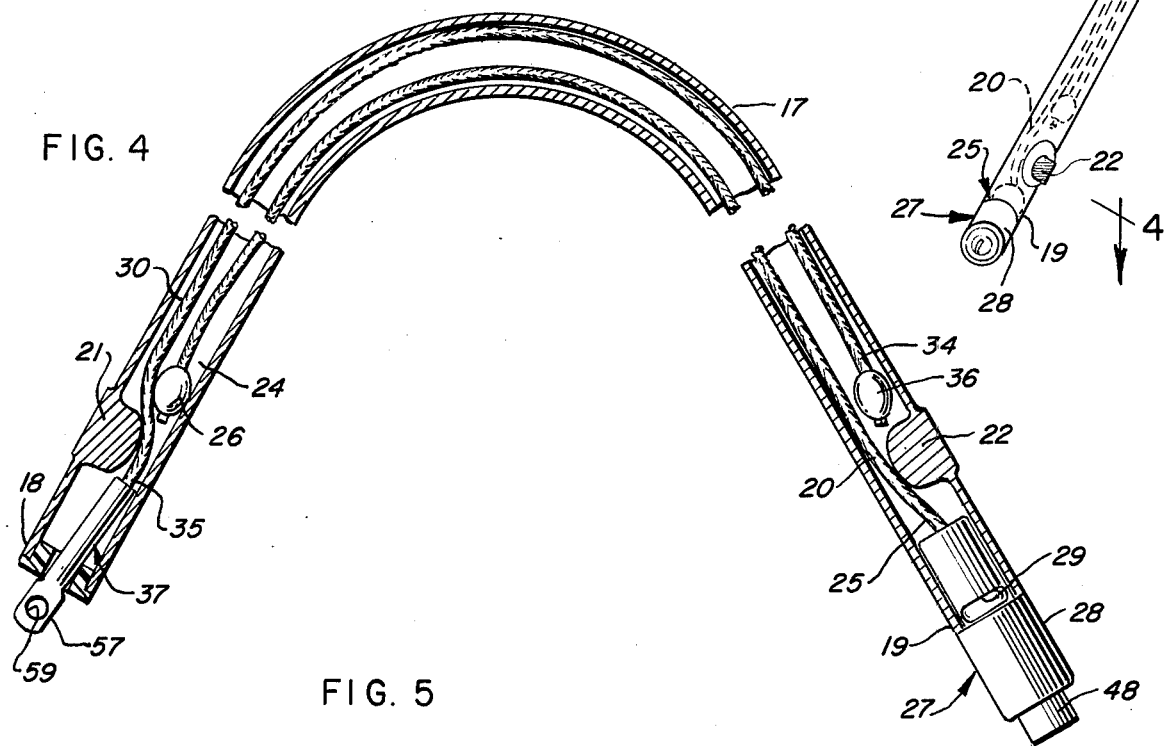
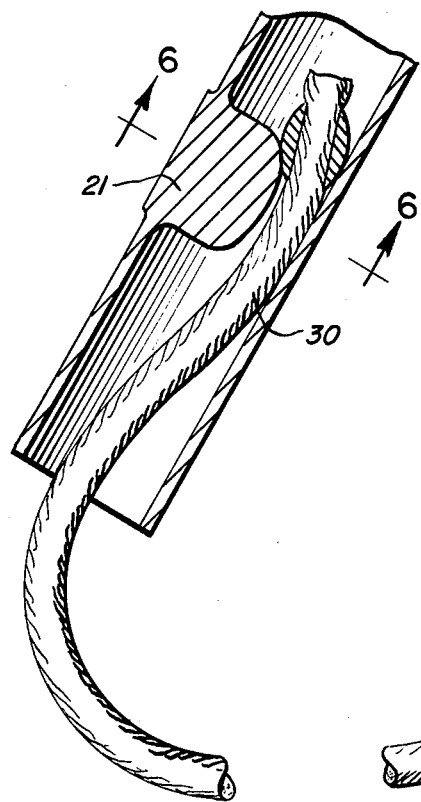
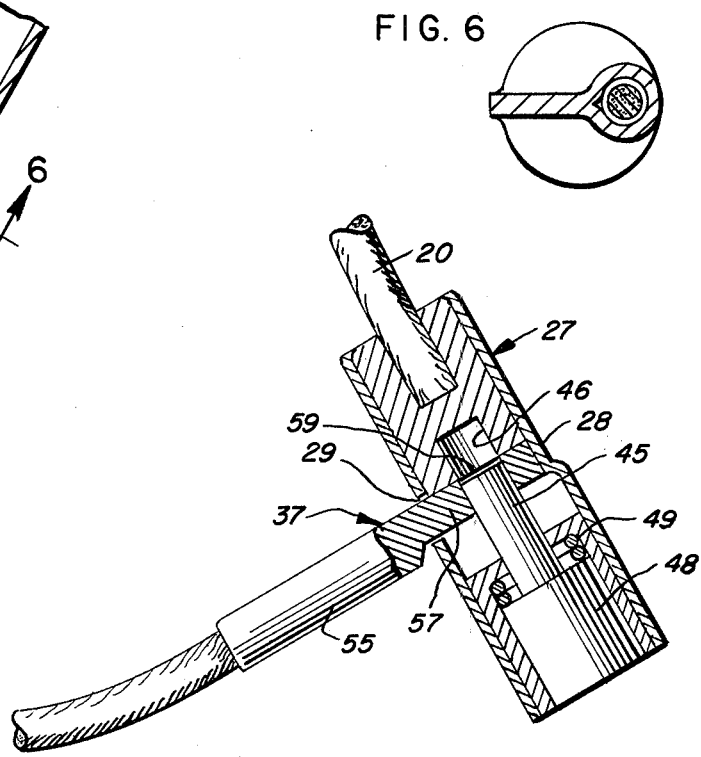

LOCK BAR ASSEMBLY

BACKGROUND OF THE INVENTION

The field of locking devices including chains, cables, padlocks, and the like is quite extensive. In the recent past, the desire and the commercial feasibility of providing self-contained locking means has become commercially important. The most obvious application of such self-contained locking devices is in connection with bicycles in view of the excessive number of bicycles which are the subject matter of theft and the like. The most common form of a locking device for locking a bicycle is to simply provide a chain or a cable with a padlock, the chain or cable being wound about the wheels and the frame and interconnected with the padlock so that unauthorized removal is rendered difficult. It is apparent, however, that it is cumbersome, at best, to expect the operator of the bicycle to carry a chain, padlock and key in order to effect the interlocking of the bicycle to prevent theft or unauthorized removal. In addition, where other articles are intended to be locked, for example, a rack containing a row of tires as is commonly seen in service stations or other facilities, the cables or chains must be made quite long and it is therefore impossible to utilize the same type of chain for bicycle use and other use as well.

Various solutions have been proposed for at least simplifying the problems associated with providing bicycle chains or cables, and the art does show a variety of such devices. For example, German Pat. No. 876,220 shows the provision of a cable which is strung through the hollow tubing portion of the bicycle frame. The leading end of the cable is provided with a lock head which accommodates the insertion of a cooperating lock device such that the cable may be pulled or extracted from the bicycle frame until a stop position is reached and the cable then wound about a stationary object in order to lock the bicycle thereto. The same type of device is also shown in German Pat. No. 744,336 which again employs the hollow tubing of the bicycle frame to accommodate the positioning of a cable securely mounted therein. The cable is extracted from the tube, wound about the bicycle tire, and then lockingly engaged to another portion of the bicycle.

Another version of the same type of device is shown in German Pat. No. 625,711 where, once again, the bicycle frame is employed as the hollow tube and a cable is positioned within the tube which may be extracted in order to lockingly engage to another portion of the bicycle and thereby interlock the vehicle.

Another version of the same type of device is shown in German Pat. No. 539,919 wherein the bicycle frame is again utilized as the housing for a chain or cable which may be extracted in order to interconnect or lock the bicycle to a stationary object.

It will be apparent from a review of the prior art devices available commercially, as well as those disclosed in prior art patents that if the frame or tubing of a given article is used as the housing for the cable or chain, the locking assembly is generally a single purpose useage and cannot be employed for use in connection with interlocking other types of articles. It is apparent from a review of the above-mentioned references that where a bicycle frame is used as the housing for a cable or chain, the locking assembly must be specially constructed and form a part of the bicycle frame. No other useage can be obtained and in fact, the locking assembly cannot be sold as a separate item. For example, clearly the type of device described and shown in the above-mentioned patents could in no way be adapted for use in connection with a tire rack since, in most cases, tire racks are formed of tubular steel which are not hollow. The last mentioned point introduces another difficulty inherent in such devices in that where a storage shelf or rack is formed of tubular steel which is not hollow, it is not possible to employ a cable or chain strung within the interior thereof in order to form a self-contained locking assembly.

OBJECTS AND ADVANTAGES

The principal object of the present invention is to provide a self-contained lock bar assembly which is formed as a separate entity and is adapted for mounting upon any of a number of a variety of articles and will permit the interlocking of the article to itself.

A further object of the invention is to provide a lock bar assembly of the type generally described above which is formed by a tube having opposed open ends, the tube being hollow throughout the interior portion thereof and provided with two crimp portions, one crimp portion adjacent each end of the tube, the crimp portion extending a substantial length along the transverse diameter of the tube, a pair of first and second cables provided within the hollow tube and each cable having an interior end and an exterior end, each of the cables carrying stop means positioned at the interior ends thereof, the stop means coacting with a corresponding crimp to form a stop position such that the interior end of each cable is securely held within the confines of the tube when the cable is fully extracted, lock head means provided on the exterior end of the first cable and mating lock pin means provided on the exterior end of the second cable, each of the cables being reciprocally moveable within and out of the tube until the stop positions, respectively, have been reached, or until the lock head and lock pin means have been lockingly engaged.

In connection with the foregoing object, it is still a further object of this invention to provide a lock bar assembly of the type described wherein the crimp portions function not only as stop positions, but also as mount points for mounting the tube to any of a number of a variety of articles.

A further object of this invention is to provide a lock bar assembly of the type described above, wherein the lock head means comprises a cylindrical head which includes a lock slot and a lock rod reciprocally mounted within the cylindrical head adapted to move reciprocally through the lock slot, and wherein the lock pin means comprises a lock ring which is sized so as to be insertable within the lock slot and wherein the lock rod is actuateable to move into and through the lock ring in order to securely hold the two exterior ends of the cables together when interlocking the device.

Another object of the invention is to provide a lock bar assembly of the type described above, wherein the hollow tube is formed in the shape of a V-shaped configuration in order to accommodate the mounting thereof to a variety of articles such as tire racks, bicycles, and the like.

Another object of the invention is to provide a lock bar assembly of the type generally described above, wherein in an alternative embodiment, the exterior ends of the two cables are each provided with lock pins, each having a lock ring wherein to interlock the exterior ends of the two cables, the same are extracted from the hollow tube and placed in vertical alignment such as to accommodate the insertion of a padlock therethrough.

Further objects and features of the invention pertain to the particular arrangement of the parts and elements whereby the above outlined, and additional operating features thereof are attained.

These and other objects of the invention will best be understood by reference to the accompanying specification and to the drawings, wherein, FIG. 1 is a perspective view showing the lock bar assembly of the present invention mounted on a bicycle frame;

FIG. 3 is a perspective view showing the lock bar assembly of the present invention with the cables securely nested within the V-shaped hollow tube in the form in which the invention would appear as a commercial item;

FIG. 4 is a side elevational view, in cross-section, showing the V-shaped tube as well as the first and second cables contained within the tube and indicating the lock head means and lock pin means associated with each of the two cables, as well as the manner in which the stop positions function, taken in the direction of the arrows along the line 4—4 of FIG. 3;

FIG. 5 is a side elevational view, partly broken away and in cross-section, showing the manner in which the second cable may be extracted from the hollow tube until the interior end thereof meets the stop position, and wherein the exterior end thereof is lockingly engaged with the lock head portion of the first cable;

FIG. 6 is a cross-sectional view illustrating the crimp portion thereof and how the same functions as a stop position, taken in the direction of the arrows along the line 6—6 of FIG. 5;

Figure 7:
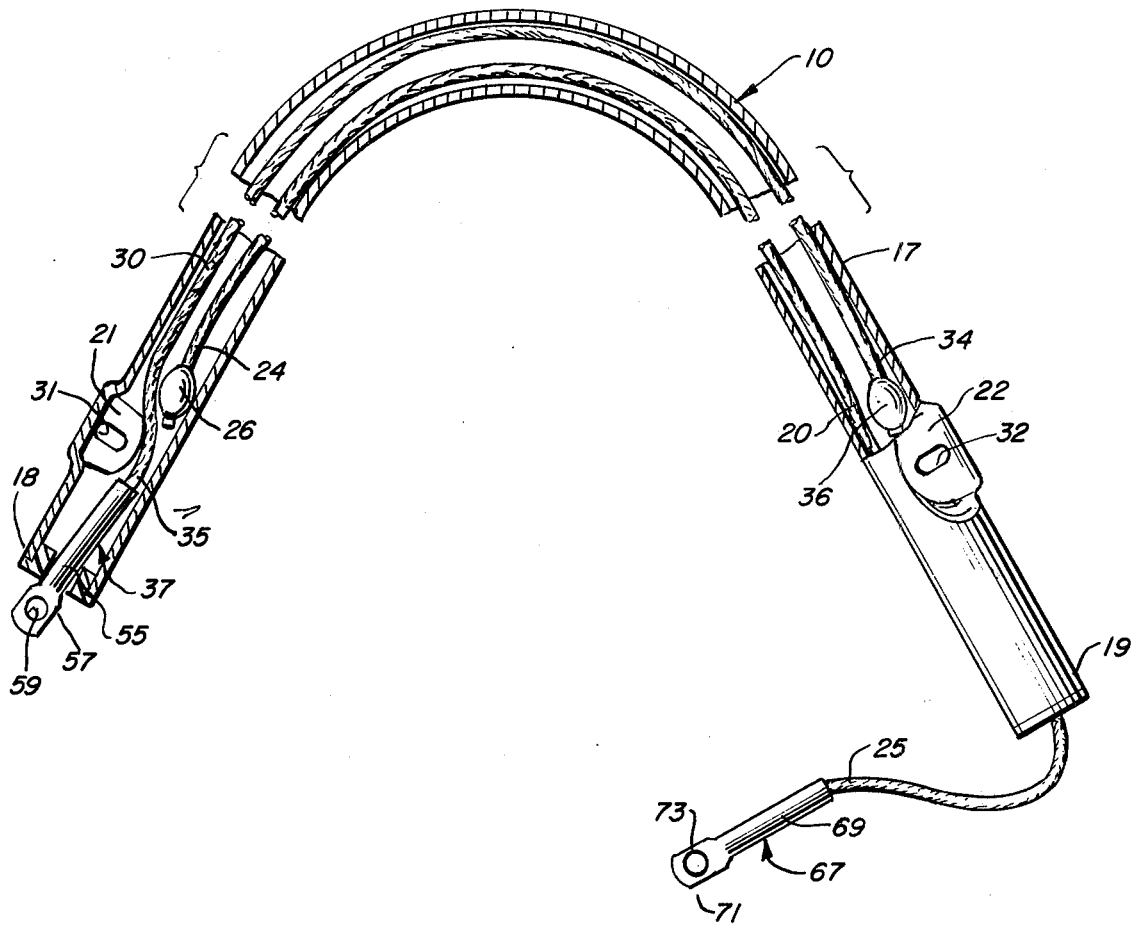
Figure 8:
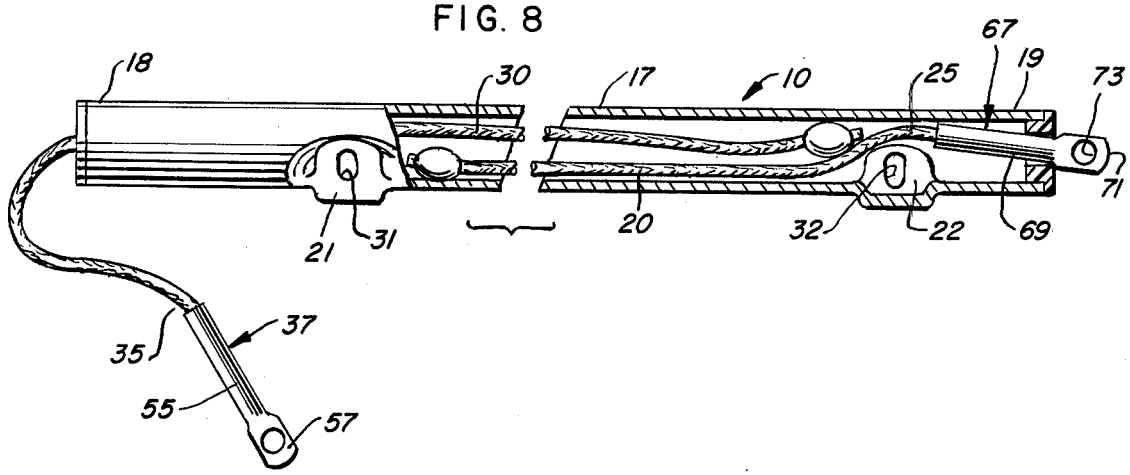

FIG. 7 is a side elevational view, in cross-section, showing another embodiment of the lock bar assembly of the present invention wherein the exterior ends of the first and second cables are each provided with lock pins, each having a lock ring formed thereon such that the same may be brought into vertical alignment to accommodate the insertion of a padlock therethrough; and FIG. 8 is a side elevational view, partly in cross-section, showing still another embodiment of the invention wherein the lock bar assembly is provided in the form of a straight horizontal hollow tube and wherein the cables are each provided with lock pins and lock rings at their exterior ends in order to simplify the means for locking the same together by inserting a padlock through the two aligned ends.

SUMMARY OF THE INVENTION

In summary, it is the intention of the present invention to provide a self-contained lock bar assembly which may be manufactured and sold as a separate unit and which is applicable to a variety of articles. The lock bar assembly of the present invention may be mounted upon any number of articles by any suitable means such as welding, bolting, or the like, and will function to interlock the article to which it is attached. One embodiment of the lock bar assembly of the present invention consists of a V-shaped tube having opposed outer ends and including crimp portions positioned adjacent the outer ends thereof, first and second cables reciprocally positioned within the tube and constructed in a manner to reciprocally move into and out of the V-shaped tube, the interior ends of the cables each provided with stop means which coact with the crimp portions to form a stop position such that the cable is securely held within the tube at its interior end, and wherein the exterior ends of each of the cables is provided with male and female, respectively, lock means to permit interconection thereof. The advantage to the lock bar assembly of the present invention is principally that the item may be manufacturered and sold as a separate unit and has a wide variety of applications including bicycles, tire racks, display shelves, or any other articles which are either moveable, or which will accommodate a variety or a number of loosely held articles thereon and wherein the interlocking thereof to the shelf or rack is desirable.

DETAILED DESCRIPTION OF THE INVENTION

Figure 1:
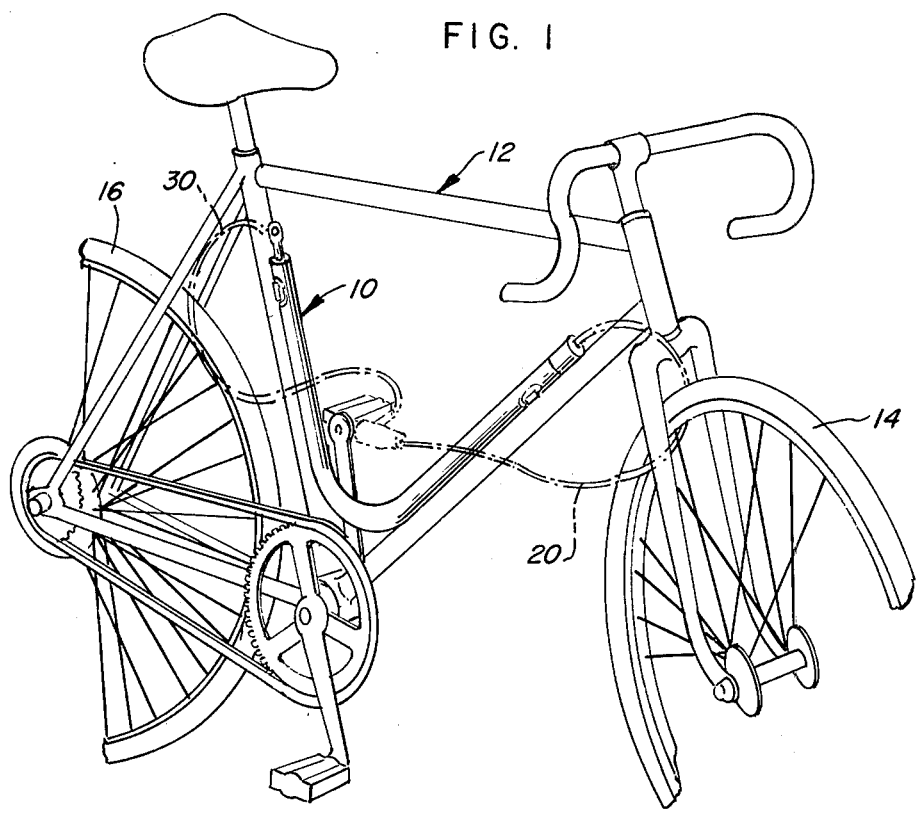
Figure 2:
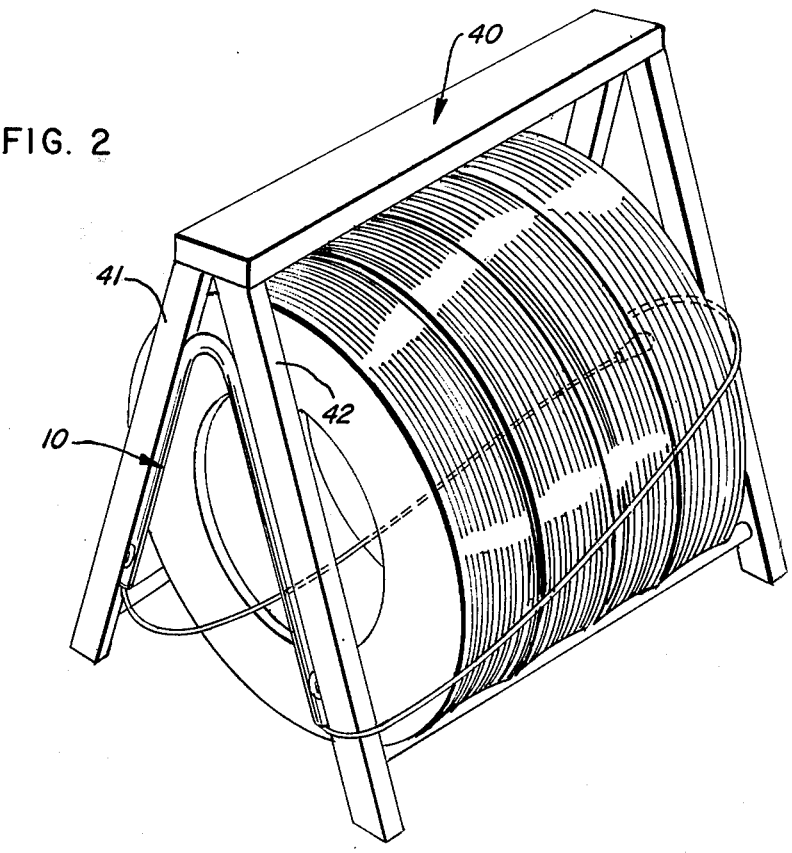
FIG. 2 is a perspective view showing the lock bar assembly of the present invention mounted on a tire rack.

With specific reference to the drawings, FIG. 1 and 2 generally indicate two applications to which the invention may be applied. As shown in FIG. 1, the lock bar assembly, generally referred to by the numeral 10, is shown to be mounted to a bicycle frame 12, in any suitable manner which contemplates a permanent mounting. The mounting may be by welding the bar to the frame, or by bolting the lock bar assembly 10 to the frame 12.

As is further illustrated in FIG. 1, the lock bar assembly 10 of the present invention permits the first cable 20 to be extracted from the tube, and similarly, the second cable 30 to be extracted from the opposed end of the tube, and wound about the wheels 14 and 16 of the bicycle respectively. The exterior ends of the first and second cable 20 and 30 respectively may then be interconnected in a manner which will be more fully described hereinafter. Clearly, once the lock bar assembly 10 has assumed the configuration as shown in FIG. 1, the article consisting of a bicycle will be securely interlocked.

In FIG. 2 of the drawings, the lock bar assembly 10 of the present invention is shown to be mounted on a tire rack 40 of the type generally observed in service stations or tire facilities. It will be observed that so long as the tire rack 40 provides mounting supports such as legs 41 and 42 respectively, the lock bar assembly 10 may be appropriately mounted thereon.

With reference to the remaining figures of the drawings, the details of construction of the lock bar assembly 10 of the present invention are more thoroughly illustrated. The lock bar assembly 10 is shown to be formed by a V-shaped tube 17 having opposed ends 18 and 19 respectively. Adjacent each of the opposed ends 18 and 19 respectively are shown to be two crimp portions 21 and 22, respectively. The V-shaped tube 17 is shown to have a hollow interior and accommodates the provision of a first cable 10 and a second cable 30. The first cable 20 is shown to include an interior end 24 and an exterior end 25. The interior end 24 of the cable 20 further includes a stop knob 26 while the exterior end 25 of the cable 20 includes a lock head 27. The details of the lockhead 27 will be more fully defined in connection with FIGS. 4 and 5 of the drawings hereinbelow.

It will further be observed from reference to FIGS. 3 and 4 of the drawings the manner in which the stop knob 26 coacts with the crimp portion 22 to form a stop position for the cable 20 such that when the cable 20 has been extracted to its ultimate length, the stop knob 26 will be restrained by the crimp portion 22 from further removal from the tube 17.

The second cable 30 is shown to similarly include an interior end 34 and an exterior end 35. The interior end 34 of the cable 30 is similarly provided with a stop knob 36, while the exterior end of the second cable 30 is provided with a lock pin 37. It will be appreciated that the stop positions formed as between the respective stop knobs 26 and 36, as the same coact with the crimp portions 21 and 22 respectively are similar in function and in construction.

It will similarly be observed that the two cables 20 and 30, respectively, are freely reciprocal within the V-shaped tube 17 such that each of the cables 20 and 30 may be fully extracted until the stop positions have been attained. As indicated previously, each end of the tube 17 is provided with the crimp portions 21 and 22, each crimp portion extending for a length of the tube for a distance along the transverse axis thereof such that the diameter of the stop knobs 26 and 36 respectively are greater than the open hollow of the tube immediately behind the respective crimp portions 21 and 22 respectively. In this manner, when each of the two cables 20 and 30 are extracted to their full extent, the stop knobs 26 and 36 respectively will be securely held within the tube 17 since the same are not permitted to pass behind the respective crimp portions 21 and 22, respectively. This particular sizing relationship is more specifically shown in FIG. 6 of the drawings. In this view, it is clearly apparent that the second cable 30 is sized such that it can pass through the hollow portion behind the crimp portion 21 whereas the stop knob 36 clearly is of a dimension sufficiently great such that it cannot pass behind the crimp portion 21.

With reference to FIGS. 4 and 5 of the drawings, the details of the lock head 17 and lock pin 37 are more clearly illustrated. As indicated previously, the first cable 20 is provided with lock head 27 which is formed by a cylindrical head 28 provided with a lock slot 29. Interiorly of the cylindrical head 28 is a lock rod 45 which is reciprocally moveable within a rod cylinder 46 contained within the cylindrical head 28. The lock rod 45 is actuated by a key head 48 which, upon insertion of a properly cut key, will actuate the lock rod 45 to move upwardly into the rod cylinder 46 and upon the reverse actuation of the key, will move downwardly through the rod cylinder 46, mainly by the action of the coil spring 49.

the construction of the lock pin 37 mounted on the exterior end 35 of the second cable 30 is similary shown in FIGS. 4 and 5 of the drawings. The lock pin 37 is shown formed by a collar 55 into which the cable 30 is securely mounted. The outer end of the collar 55 is formed into a lock ring 57 which is dimensioned and sized so as to be insertable within the lock slot 29 formed in the cylindrical head 28. It will be observed that the lock ring 57 has a central aperture 59 having a diameter slightly greater than the diameter of the lock rod 45. As shown in FIG. 5 of the drawings, in order to interlock the lock pin 37 on the exterior end of the second cable 30 into the lock head 27 formed at the exterior end 25 of the cable 20, the lock ring 57 is inserted into the lock slot 29 until the central aperture 59 is in alignment with the lock rod 45. Once the key is inserted into the key head 48, this actuates the lock rod 45 to be reciprocated upwardly through the central aperture 59 in the lock ring 57 and further upwardly into the rod cylinder 46. This position of the lock rod 45 will be maintained once the key has been turned in the key head 48. Once interlocked, it is clear that neither of the two cables 20 and 30, respectively, can be removed either from the V-shaped tube 17, or from each other. Upon reinsertion of the key into the key head 48, the coil spring 49 operates to extract the key head 48 thereby to actuate and reciprocate the lock rod 45 downwardly through the lock ring 57 until the same is free and able to be extracted from the lock slot 29. The reverse of this operation will thereby open the cables and permit the removal of items contained on the article previously interlocked. It will also be apparent that the V-shaped tube provides a convenient storage facility for the two cables 20 and 30 thereby obviated the need for having loose chains or cables in order to effect the locking operation for articles which may be free standing or moveable.

It will further be apparent from the above description that the crimp portions 21 and 22, respectively, form convenient mount points. As was indicated previously, the crimp portions 21 and 22 may provide mount points of the type adapted for welding the V-shaped tube 17 to the article which is intended to accommodate the same, for example, the bicycle or the tire rack shown in FIGS. 1 and 2 of the drawings. Alternatively, the crimp portions 21 and 22 could be provided with apertures such that the tube 17 can be bolted to the appropriate structure or article. Various other means for mounting the tube 17 to a given article are clearly contemplated within the scope of the present invention and the particular mounting means employed are not considered to be critical to the invention herein.

Furthermore, with respect to the size of the V-shaped tube 17, clearly it is contemplated that smaller and larger versions of the same are intended. Quite obviously, the sizing of the devices would clearly be a function of ultimate useage, manufacturing efficiencies, and sales' ability. It will be apparent, however, that where the ultimate length of the V-shaped tube 17 is extensive, then cables 20 and 30 of greater length are permitted to be positioned within the tube 17. This extends the ultimate useage of the device since the greater length of cables permits a larger article to be interlocked. It will also be appreciated that the particular angle formed by the V-shaped tube 17 is not critical, however, as a matter of manufacturing efficiency, it is considered to be appropriate to select an angle which accommodates the most common useages, such as bicycles, racks, display racks, and the like.

With respect to FIG. 7 of the drawings, an alternative embodiment of the lock bar assembly of the present invention 10 is illustrated. The principal differences to be noted between the lock bar assembly 10 shown in FIG. 7 and the lock bar 10 as illustrated in FIG. 4 relates to principally two areas. It will be noted that in FIG. 7, the crimp portions 21 and 22 respectively are provided with crimp apertures 31 and 32 respectively. As indicated previously, as opposed to welding the lock bar assembly 10 to the desired structure, the lock bar 10 may be mounted by inserting tamper-proof (not shown) through the crimp apertures 31 and 32 to mount points provided on the appropriate device such as a bicycle, tire rack, display rack, or the like. Alternatively, one may employ steel cables about the support frame of the structure to which the lock bar assembly is mounted, such that the tamper-proof bolts are inserted through the steel belt, and the crimp apertures 31 and 32 respectively thereby to securely hold the lock bar assembly 10 in position thereon.

It will further be noted that the first cable 20, as opposed to being provided with a lock head at its exterior end 25, is provided with a second lock pin 67 which is formed by a collar 69, terminating in a lock ring 71 provided with a lock aperture 73. The construction of the lock pin 67 is shown to be identical with th construction of the lock pin 37 and it is intended in this embodiment to effect the interlocking of the two cables 20 and 30 respectively by simply extracting the two cables 20 and 30 from the hollow portions of the tube 17, winding the same about the article intended to be interlocked, until the lock rings 57 and 71 are brought into alignment. In this posture, the lock ring apertures 59 and 73 respectively are brought into horizontal alignment in order to accommodate the insertion of a padlock therethrough. It is contemplated that in this particular embodiment, manufacturing costs are minimized since the necessity for a lock head assembly of the type shown in FIGS. 4 and 5 of the drawings is eliminated. Hence, the same result can be achieved without the necessity of the expenditure of manufacturing costs to provide a lock head while still simplying the locking procedure on behalf of the user thereof.

In FIG. 8 of the drawings, a further embodiment of the invention is shown wherein the lock bar assembly 10 is formed by a horizontally straight hollow tube 17 which again is provided with opposed ends 18 and 19 respectively. The construction of the lock bar assembly 10 as shown in FIG. 8 is identical with respect to the construction of the lock bar assemblies 10 shown in FIGS. 4 and 7 of the drawings with the exception that as shown in FIG. 8, the hollow tube is perfectly horizontal in configuration. It will further be noted that the two cables 20 and 30 respectively are provided with exterior ends 25 and 35 respectively which carry lock pins 37 and 67 in the same manner as the assembly as shown in FIG. 7 of the drawings. The construction of each of the lock pins 37 and 67 are identical as described with respect to FIG. 7 of the drawings.

It will further be appreciated that the lock bar assembly 10 as shown in FIG. 8 of the drawings may be constructed such that the crimp portions 21 and 22 respectively eliminate the crimp apertures 31 and 32 respectively in order to provide mount points which must be welded to the appropriate structure, and furthermore, one of the cables may be provided with a lock head 27 of the type illustrated and described in connection with FIGS. 4 and 5 of the drawings. The purpose for showing the embodiment in FIG. 8 of the drawings is to indicate that the specific configuration of the lock bar assembly 10 is principally a matter of choice depending upon the ultimate field of useage, but overall, the internal construction of the lock bar assembly 10 may be maintained identically with the constructions as described above in connection with the other embodiments. Once again, and as indicated previously, manufacturing costs and market acceptability are perhaps two guiding factors in determining the particular configuration of the hollow tube as well as the type of locking means employed for interconnecting the two cables 20 and 30 respectively.

It will be apparent from the above description that the present invention provides a self-contained lock bar assembly which is adapted to a variety of useages. In short, it is not necessary to adapt a bicycle, tire rack, display case, or other similar article to be in any special construction in order to incorporate therein a self-contained locking means. The present invention, in effect, permits the separate installation of a self-contained lock bar assembly and is considered, therefore, to have greater utility than any device as heretofore available.

It will further be appreciated from the above description that the lock bar assembly of the present invention provides ultimate simplicity, while still resulting in an extensive field of use since the stop positions are inherently formed in the device during the manufacture of the V-shaped tube in cooperation with the construction of the cable. Assuming that the lock bar assembly is appropriately mounted to any given device, a strong and secure self-contained interlock system may be provided for any number of articles.

While there has been described what is at present considered to be the preferred embodiment of the invention, it is to be understood from the above description and the appended claims that various modifications may be formed therein and all of such obvious modificatons or variations are intended to be covered within the scope of the appended claims.

What is claimed is:

1. A lock bar assembly adapted for attachment to a variety of articles to effect the interlocking of said articles, comprising in combination,
   a hollow V-shaped tube having opposed ends and being hollow throughout the interior portion thereof, the arms of said V-shaped tube being substantially equal in length,
   said tube provided with a crimp portion adjacent each of said opposed ends,
   each of said crimp portions extending a substantial length along the transverse interior diameter of said tube, wherein said crimps are each formed as flat portions thereby to function as mount points for mounting the said lock bar assembly to an article to be locked,
   a pair of first and second cables provided within said hollow tube and each cable having an interior end and an exterior end,
   each of said cables carrying stop means positioned at the interior ends thereof, said stop means coacting with a corresponding crimp to form a position whereby the interior end of each of said cables is securely held within the confines of said tube when fully extended,
   lock means provided on the exterior end of said first cable and mating lock means provided on the exterior end of said second cable,
   and each of said cables being reciprocally movable into and out of said tube until the interior ends thereof reach said stop positions,
   whereby said hollow tube may be mounted on any of a variety of articles by mount means thereby to securely hold the same to the article and said first and second cables may be reciprocally moved out of the confines of said tube to encircle the article to be locked until said lock means of said first and second cables may be lockingly engaged thereby to interlock the same and securely hold between the confines of said hollow tube and said first and second cables the articles to be interlocked.

2. The lock bar assembly as set forth in claim 1 above, wherein said lock means on said first cable comprises a cylindrical head having a lock slot positioned therein, and further including a reciprocally moveable lock rod positioned within said head and reciprocally moveable through said slot, and said lock means on said second cable comprises a lock ring sized for insertion within said lock slot and adapted to nest within said lock slots such that said lock rod may be reciprocally moved through said lock ring thereby to lockingly engage said lock ring to said lock head.

3. The lock bar assembly as set forth in claim 2 above, wherein said first cable lock means further includes a keyed lock mounted in cooperating relationship with said lock rod whereby upon actuation with a proper key, said lock rod may be actuated to reciprocate through said lock ring to lockingly engage said second cable in locking relation to said first cable.

4. The lock bar assembly as set forth in claim 1 above, wherein said stop means comprises an enlarged knob sized and dimensioned such that the diameter of said knob is greater than the open portion of said tube hollow adjacent a corresponding crimp portion whereby said knob functions to form a stop position of the cable in cooperation with said crimp portion.

5. The lock bar assembly as set forth in claim 1 above, wherein the end of said tube carrying said second cable having said mating lock means provided thereon, is provided with an end cap having a central aperture therein to accommodate the movement of said second cable therethrough.

6. The lock bar assembly as set forth in claim 1 above, wherein each of said lock means and said mating lock means on said first and second cables comprises a lock pin formed by a lock collar, said lock collar terminating in a lock ring having a central aperture, whereby the interlocking of said first and second cables may be achieved by extracting said cables from said hollow tube until said lock rings are in horizontal registry such as to accommodate the insertion of a padlock through said central apertures.

7. The lock bar assembly as set forth in claim 1 above, wherein each of said crimp portions is provided with a crimp aperture whereby said lock bar assembly may be mounted to an appropriate article by the use of tamper-proof bolts.

* * * * *